(12) United States Patent
Velev et al.

(10) Patent No.: US 11,825,530 B2
(45) Date of Patent: *Nov. 21, 2023

(54) METHOD AND APPARATUS FOR DETERMINING WHETHER TO TRANSMIT NETWORK SLICE SELECTION ASSISTANCE INFORMATION

(71) Applicant: Lenovo (Singapore) Pte. Ltd., New Tech Park (SG)

(72) Inventors: Genadi Velev, Darmstadt (DE); Prateek Basu Mallick, Langen (DE); Ravi Kuchibhotla, Clarendon Hills, IL (US); Joachim Löhr, Wiesbaden (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 106 days.

This patent is subject to a terminal disclaimer.

(21) Appl. No.: 17/496,755

(22) Filed: Oct. 7, 2021

(65) Prior Publication Data

US 2022/0030642 A1  Jan. 27, 2022

Related U.S. Application Data

(63) Continuation of application No. 16/590,144, filed on Oct. 1, 2019, now Pat. No. 11,147,106.

(60) Provisional application No. 62/739,764, filed on Oct. 1, 2018.

(51) Int. Cl.
| | |
|---|---|
| H04W 76/10 | (2018.01) |
| H04W 16/02 | (2009.01) |
| H04W 36/00 | (2009.01) |
| H04W 48/10 | (2009.01) |

(52) U.S. Cl.
CPC .......... *H04W 76/10* (2018.02); *H04W 16/02* (2013.01); *H04W 36/0061* (2013.01); *H04W 48/10* (2013.01)

(58) Field of Classification Search
CPC . H04W 76/10; H04W 16/02; H04W 36/0061; H04W 48/10
USPC ........................................................ 370/328
See application file for complete search history.

(56) References Cited

U.S. PATENT DOCUMENTS 11,026,121 B2 * 6/2021 Shih ...................... H04W 28/16

* cited by examiner

*Primary Examiner* — Gbemileke J Onamuti
(74) *Attorney, Agent, or Firm* — Loppnow & Chapa (57) ABSTRACT

A method and apparatus are provided, which include transmitting to a user equipment via an access stratum signaling an indication as to whether network slice selection assistance information is required as part of radio connection establishment or resumption signaling, and receiving the network slice selection assistance information. A determination is then made as to whether to accept or to reject a radio resource control connection establishment or resumption based on the received network slice selection assistance information.

20 Claims, 5 Drawing Sheets

METHOD AND APPARATUS FOR DETERMINING WHETHER TO TRANSMIT NETWORK SLICE SELECTION ASSISTANCE INFORMATION

FIELD OF THE INVENTION

The present disclosure is directed to a method and apparatus for determining whether to transmit network slice selection assistance information, for example as part of the radio connection establishment signaling.

BACKGROUND OF THE INVENTION

Presently, user equipment, such as wireless communication devices, communicate with other communication devices using wireless signals, such as within a network environment that can include one or more cells within which various communication connections with the network and other devices operating within the network can be supported. Network environments often involve one or more sets of standards, which each define various aspects of any communication connection being made when using the corresponding standard within the network environment. Examples of developing and/or existing standards include new radio access technology (NR), Long Term Evolution (LTE), Universal Mobile Telecommunications Service (UMTS), Global System for Mobile Communication (GSM), and/or Enhanced Data GSM Environment (EDGE).

In some instances it has been deemed beneficial to create the possibility for multiple virtual networks, that can operate independently, but which function within the same physical hardware. This can be called network slicing. In some instances, different slices may be configured and maintained in order to support different application, services, and/or in order to support other arrangements that may benefit from a form of separation from the other slices, where each slice may potentially have an alternative overall purpose. In essence, each slice is similar to a separate and distinct virtual network, where each particular network slice can have its own architecture, as well as have its own separate provision management and security, where each network slice can be tailored to take into account support, which is better adapted for the corresponding purpose associated with a particular slice.

Network slicing can form another layer of potential distinction, when managing the communication of a particular user equipment entity, when interacting with the elements supporting the physical network environment. In some instances, the network environment will behave as if each of the slices correspond to multiple different networks, where each of the slices may have different requirements associated with access and interaction in establishing and maintaining a communication connection. In connection with establishing and maintaining a communication connection between a particular user equipment and one or more potential slices of a network environment, it may be helpful for the user equipment to exchange and/or convey network slice selection assistance information. In some cases, this information may be conveyed as part of the initial radio resource control signaling. The present inventors have recognized that it may be beneficial to more flexibly allow network slice selection assistance information to be conveyed between the user equipment and the network, where an indication can be exchanged between the user equipment and each particular network, which informs the user equipment of the amount of and/or the type of assistance information and the manner in which it should be shared, which can change dynamically as the interaction between the user equipment and the network changes. In some instances it may be preferred for the user equipment not to share any network slice selection assistance information with the network.

SUMMARY

The present application provides a method in a network entity. The method includes transmitting to a user equipment via an access stratum signaling an indication as to whether network slice selection assistance information is required as part of radio connection establishment or resumption signaling, and receiving the network slice selection assistance information. A determination is then made as to whether to accept or to reject a radio resource control connection establishment or resumption based on the received network slice selection assistance information.

According to another possible embodiment, a network entity for communicating with one or more user equipment in a communication network is provided. The network entity includes a controller, and a transceiver that transmits to a user equipment via an access stratum signaling an indication as to whether network slice selection assistance information is required as part of radio connection establishment or resumption signaling. The network slice selection assistance information is received via the transceiver, and the controller determines whether to accept or to reject a radio resource control connection establishment or resumption based on the received network slice selection assistance information.

These and other features, and advantages of the present application are evident from the following description of one or more preferred embodiments, with reference to the accompanying drawings.

DETAILED DESCRIPTION OF THE PREFERRED EMBODIMENT(S)

While the present disclosure is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Embodiments provide a method and apparatus for determining whether to transmit network slice selection assistance information as part of the radio connection establishment signaling.

Figure 1:
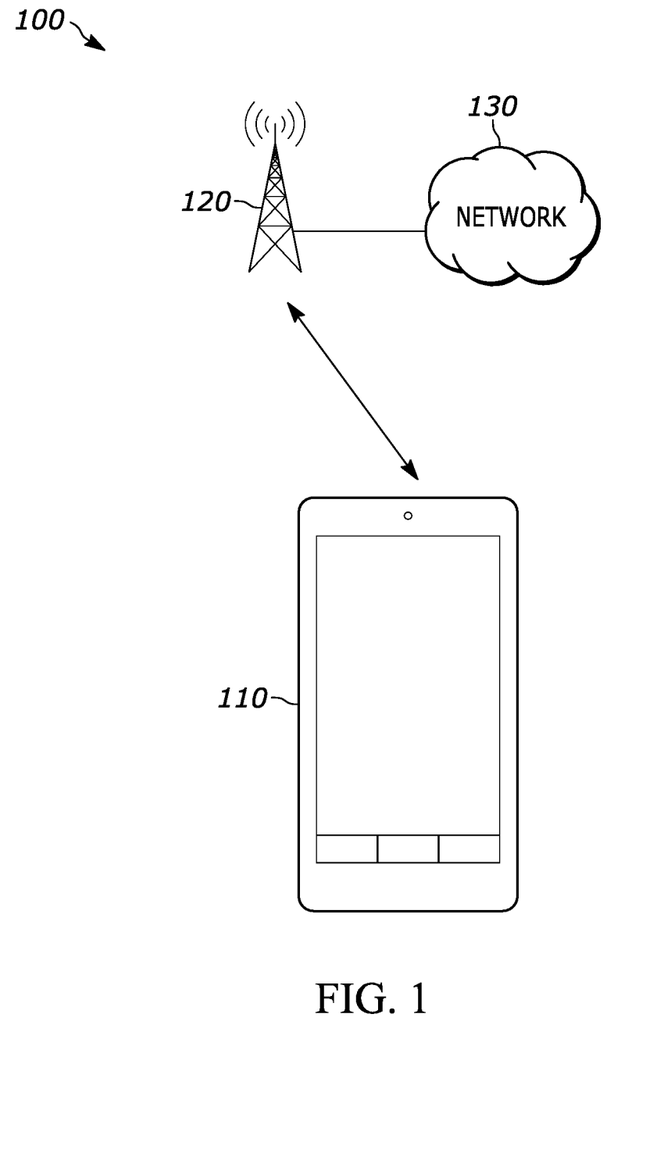
FIG. 1 is a block diagram of an exemplary network environment in which the present invention is adapted to operate.

FIG. 1 is an example block diagram of a system 100 according to a possible embodiment. The system 100 can include a wireless communication device 110, such as User Equipment (UE), a base station 120, such as an enhanced NodeB (eNB) or next generation NodeB (gNB), and a network 130. The wireless communication device 110 can be a wireless terminal, a portable wireless communication device, a smartphone, a cellular telephone, a flip phone, a personal digital assistant, a personal computer, a selective call receiver, a tablet computer, a laptop computer, or any other device that is capable of sending and receiving communication signals on a wireless network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 5th generation (5G) network, a 3rd Generation Partnership Project (3GPP)-based network, a satellite communications network, a high altitude platform network, the Internet, and/or other communications networks.

In 3GPP Rel-15, network slice selection assistance information (NSSAI) parameters are sent in the radio resource control (RRC) signaling according to the following principle, such as is described in the CT1 LS reply in C1-182643, where it is stated:

Depending on the non-access stratum (NAS) message that needs to be sent, the NAS may provide NSSAI to the lower layers as follows:
  1. For an NAS Service Request message, the NSSAI is not provided by the NAS layer
  2. For an NAS Registration Request message, the NSSAI is provided by the NAS layer except for the case when the user equipment (UE) is performing a periodic registration update However, in SA2 and in RAN2 there were extensive discussions as to what NSSAI value to include in the RRC Connection Establishment msg 5 for the specific case of the service request triggered connection establishment. In S2-187889 the following proposal had been discussed, but was not agreed:

An issue of the debate has been whether it is more meaningful to include all the single network slice selection assistance information (S-NSSAIs) of the allowed NSSAI in the NSSAI information in the RRC connection establishment msg 5 or just those of the slice(s) that is (are) triggering the service request. Note that a service request may reactivate all the protocol data unit (PDU) sessions in one go or just a selected few or just one. For example, the scheduling request (SR) may be related to mobile terminated (MT) signaling or data so it is not clear what S-NSSAI triggers the SR. So all allowed slices S-NSSAIs should be in principle a potential target of the MT signaling or data. The radio access network (RAN) may use the received NSSAI information in RRC msg 5 to trigger some initial access policies ahead of contacting the core network (CN). The benefit of including the full allowed NSSAI or a subset of it (which is the set of the slices triggering the SR) in the RRC connection establishment msg 5, is predicated on the public land mobile network (PLMN) having configured such polices in the RAN. A PLMN may choose to not configure such policies. A PLMN may also decide to configure these in certain areas of the network but not others. Also some operators may be just happy to consider the slices that are immediately used by the UE for the initial access policies, and defer any subsequent treatment to the received allowed NSSAI from the CN.

It is therefore proposed that a PLMN can instruct the UE on which behavior to adopt in the registration accept message (note that the UE is expected to include a requested NSSAI in the registration request. So, we do not discuss here the behavior for registration messages) by including an indication as to whether the UE shall include in the access stratum connection establishment caused by a service request:
  a) NSSAI set to the allowed NSSAI for the UE; or
  b) NSSAI including the S-NSSAI(s) of the network slice(s) that trigger the connection establishment; or
  c) No NSSAI.

There are some supporters behind the proposal to include the NSSAI in the RRC Connection Establishment msg 5 and even if this is not agreed in Rel-15, it may be introduced in later releases. A concern is that including the NSSAI information in the RRC signaling would make possible the avoidance of situations associated with core network (CN) overload.

Figure 2:
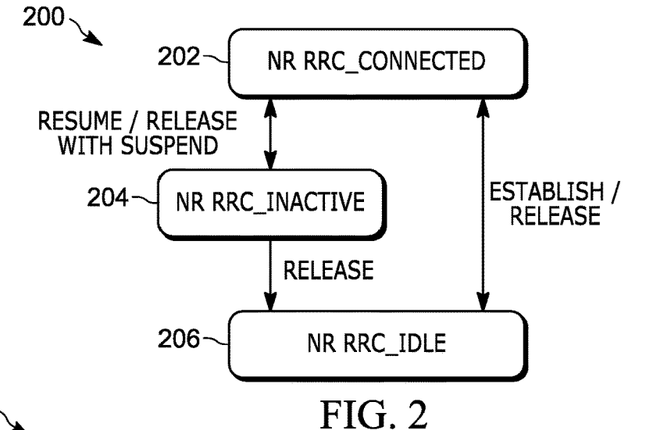
FIG. 2 is an overview of a user equipment radio resource control state machine and state transitions in connection with the new radio (NR) standard.

One additional aspect to be considered is the RRC inactive state. According to 3GPP TS 38.331, a UE is either in RRC_CONNECTED state or in RRC_INACTIVE state when an RRC connection has been established. If this is not the case, i.e. no RRC connection is established, the UE is in RRC_IDLE state. The RRC states can further be identified as follows:

RRC_IDLE 206:
  A UE specific discontinuous reception (DRX) may be configured by upper layers;
  UE controlled mobility based on network configuration;
  The UE:
    Monitors a paging channel for CN paging using fifth generation serving temporary mobile subscriber identity (5G-S-TMSI);
    Performs neighbouring cell measurements and cell (re-)selection;
    Acquires system information and can send system information (SI) request (if configured).
RRC_INACTIVE 204:
  A UE specific DRX may be configured by upper layers or by RRC layer;
  UE controlled mobility based on network configuration;
  The UE stores the access stratum (AS) context;
  A RAN-based notification area is configured by RRC layer;
The UE:
  Monitors a paging channel for CN paging using 5G-S-TMSI and RAN paging using inactive state radio network temporary identifier (I-RNTI);
  Performs neighbouring cell measurements and cell (re-)selection;

Performs RAN-based notification area updates periodically and when moving outside the configured RAN-based notification area;

Acquires system information and can send SI request (if configured).

RRC_CONNECTED 202:

The UE stores the AS context;

Transfer of unicast data to/from UE;

At lower layers, the UE may be configured with a UE specific DRX;

For UEs supporting carrier aggregation (CA), use of one or more secondary cells (SCells), aggregated with the serving primary cell (SpCell), for increased bandwidth;

For UEs supporting dual connectivity (DC), use of one secondary cell group (SCG), aggregated with the master cell group (MCG), for increased bandwidth;

Network controlled mobility within new radio (NR) and to/from evolved universal terrestrial radio access network (E-UTRA);

The UE:

Monitors a paging channel, if configured;

Monitors control channels associated with the shared data channel to determine if data is scheduled for it;

Provides channel quality and feedback information;

Performs neighbouring cell measurements and measurement reporting;

Acquires system information.

FIG. 2 illustrates an overview 200 of UE RRC state machine and state transitions in NR. A UE may have only one RRC state in NR at one time.

A general concern to be addressed includes how to make the RAN aware about the network slices which a UE intends to use as early as possible, so that the RAN can make the decision as to whether to allow access of the UE to the RAN and network resources in the case of network resource limitations (e.g. overload or congestion).

The UAC (Unified Access Control) mechanism is not aware about access and mobility management function (AMF) load and so the load of a single AMF may result in rejection of all UEs attached to any AMF. The UAC is specified to support only 32 operator defined categories, which may limit its effectiveness. Further, just 8 UAC access categories (including the standardized ones) may be broadcasted at a given time. Given this, the UAC mechanism may not be able to solve the problem of access control based on the load (or other conditions) of a particular network slice.

The previously proposed mechanism is more-or-less semi-static, i.e. the configuration in the UE is valid for a particular PLMN and the UE obeys this configuration as long as the UE camps under this PLMN.

Sending the NSSAI parameter (independent whether a single S-NSSAI or up to 8 S-NSSAI are included) in the RRC Connection Establishment msg 5 typically introduces longer RRC msg 5 which may result is a bit slower procedure. Assuming that the NSSAI information can be used in the gNB only in limited situations, e.g. when overload start message is sent from the core network (which is not expected to happen frequently), adding NSSAI information in RRC for service request could unnecessarily add load for all service requests from RRC idle.

At least one concern, which is attempted to be addressed through the present application is the question of how to better optimize the use of NSSAI in the RRC signaling for service request procedures.

A proposal has been described in S2-187889, where the NAS signaling (NAS Registration Accept message) is used to configure the UE as to whether to include NSSAI information in the AS/RRC signaling for the service request procedure. At least one drawback of this proposal is that the procedure is generally static for the whole PLMN.

At least one possible benefit of the present disclosure is a potentially enhanced ability to provide a solution for flexible configuration of the UE including when to include the NSSAI in the RRC signaling. It is proposed to allow configuration of the UEs on per cell basis.

According to a possible embodiment, at least one aspect of the present disclosure is to utilize the signaling (broadcasted system information or unicast signaling) in the current serving cell in order to determine (in the UE) whether to include the NSSAI in the RRC signaling (e.g. in the RRC signaling for a service request procedure).

There can be various alternatives as to how and which system information may be used.

In one possible alternative, related to a first possible solution, there can be a new information (parameter or indication) introduced in the broadcasted system information which can explicitly indicate whether the UEs camping on this serving cell might include the NSSAI information in the RRC signaling when, for example initiating the service request procedure, such as by including the service request in an RRC message to the RAN node.

This new SI indication (parameter) can be included in the system broadcast and set to one of the certain predefined values, for example, including instances as to whether the network should receive the NSSAI in the RRC signaling for connection establishment (such as, in an RRCSetupComplete message as defined in TS 38.331-f30 or also called RRC message #5). This new SI indication (parameter) may be always present in the system information (e.g. not an on demand indication). In another possibility, the SI indication can be made optional and can be sent on demand. In such a case, the absence of the indication shall indicate that the network slice information (S-NSSAI(s) or NSSAI) does not need to be included in the RRC signaling. Further, this SI indication can have different topological (or geographical) validity, e.g. to be cell specific or registration/tracking area specific.

This SI indication may have multiple values, which for example can mean that the indication can be encoded with 2 or more bits. For example, at least one of the following values may be possible:

a) One value may indicate to the UE that the whole list of S-NSSAI(s) part of the allowed NSSAI needs to be included in the RRC signaling;

b) Another value may indicate that only the S-NSSAI(s) are included, for which PDU connection(s) are to be activated; and c) Another value may indicate that the NSSAI information does not need to be included (e.g. in case that the indication is always sent in the SI).

In another alternative, existing parameters in the system information can be used by the UE to determine whether to include NSSAI information in the RRC signaling when initiating the service request procedure. For example, this can be a particular access category (such as for example, access category "5" or any reserved, special, or operator use access category) as part of the unified access control (UAC). The barring timer for the corresponding access category need not be present.

As another possibility, an implicit indication can be made by an access restriction of any of the access categories, which may act as the new and above discussed broadcast indication.

As a further enhancement, certain access category(ies) and/or access identities and/or UE types/classes/categories may be exempted from including any NSSAI information in the RRC signaling. For example NAS layer of UEs belonging to any of the exempted access category(ies), access identities and/or UE types/classes/categories might not provide the access stratum any NSSAI information. The indication can be sent in the SI for different UE categories, such as enhanced mobile broadband (eMBB), ultra reliable low latency communications (URLLC), and/or vehicle to everything (v2x), etc.

In another or second possible alternative, related to a further possible solution, dedicated (i.e. unicast) signaling from the RAN node (e.g. gNB or eNB) to the UE may be used to indicate whether the UE should include the NSSAI information in the RRC signaling. For example, RRC message #4 (RRCSetup message) can contain such an express indication to the UE.

In a still further or third possible alternative, related to a still further possible solution, the NAS layer can send the NSSAI information to the AS layer upon initiating a service request procedure when the NAS layer is in (E)CM IDLE state, however the AS layer decides whether to include the NSSAI information in the RRC message #5 (RRCSetupComplete). The AS layer can determine this based on an indication from the network in RRC message #4. For example if the network indicates in RRC message #4 that NSSAI information is required, the UE's AS layer can include the information in the RRC message #5. In contrast, if the network indicates in RRC message #4 that NSSAI information is not required, the UE's AS layer might not include the NSSAI information in RRC message #5.

Please note that in one example the implementation of the indication from the network in RRC message #4 can be an indication having 2 values—such as "NSSAI information not required" (or "OFF") and "NSSAI information required" (or "ON"). In another example, the implementation of the indication from the network in RRC message #4 can be a single value indication—such as "NSSAI information required".

For UE in RRC inactive state, when trying to resume the RRC connection, the UE should behave according to the SI in the current cell (for example, the cell where the UE tries to perform the resume procedure). This UE's behavior is irrespective of whether the NSSAI information was included the last time when the UE established the RRC connection. The RAN node can store UE context, but the UE may want to resume the connection in order to establish/activate the use plane resources in another network slice. The inclusion of the NSSAI information in the signaling for the resume procedure (e.g. RRC Resume Complete message) may be helpful in a case where the resume procedure is initiated by the UE due to a trigger from the NAS layer for establishing a connection to a new/another network slice (for example, activating or establishing a new PDU Session).

Figure 3:
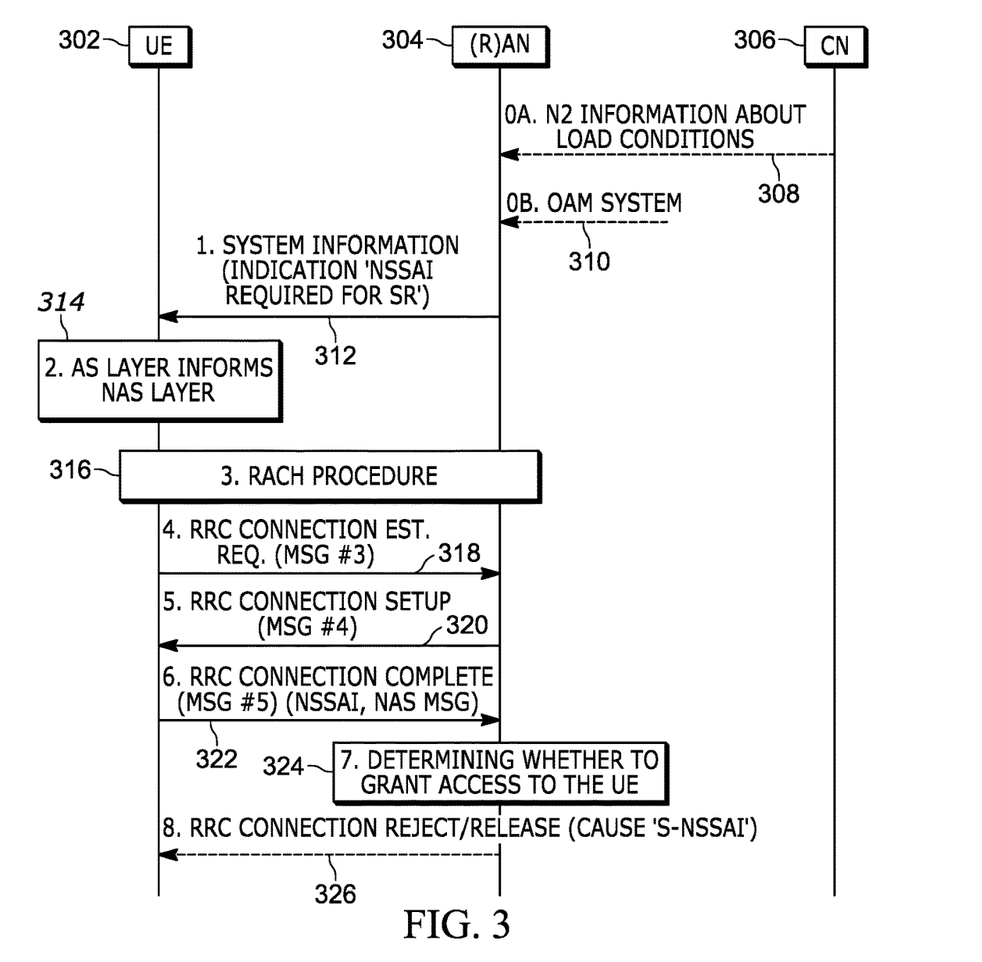
FIG. 3 is a signaling flow diagram for user equipment determination as to whether to transmit network slice selection assistance information as part of the radio connection establishment signaling.

It is noted that for any of the solutions above, the RAN node can determine whether to transmit (or broadcast) the indication that NSSAI information is requested and/or required in the RRC signaling as described in step zero in FIG. 3.

FIG. 3 shows the signaling flow of one or more of the alternatives identified in the present disclosure, and more specifically illustrates a signaling flow diagram 300 for user equipment determination as to whether to transmit network slice selection assistance information as part of the radio connection establishment signaling.

The following is the description of the steps:

0. The RAN 304 receives input either from core network 306 (step 0a) or from the OAM system (step 0b) to inform the UEs 302 about the overload for a particular network slice.
   a. By receiving 308 input from the core network (CN) 306, such as signaling from AMF(s) on the N2 interface indicating certain load or congestion in the core network; or
   b. By receiving 310 input from the OAM (Operation, Administration and Maintenance/Management) system configuring the RAN nodes and operated by the network manager.
1. The RAN node determines 312 to include the NSSAI information in the System Information.
   This indication is described as 'NSSAI required for SR' but any other appropriate IE name can be used. Please refer to the description of the first solution noted above for more details.
2. When receiving the indication about required NSSAI information in the AS signaling for establishing connection for service request, the UE performs 314 an internal configuration as described in the above noted first solution and the UE internal configuration below. This step may include the activation or the deactivation of the mechanism of including the NSSAI information in the RRC connection establishment signaling.
3. The UE initiates 316 an RACH (Random Access Channel) procedure.
4. The UE sends 318 an RRC connection establishment request message, which can also be described as an RRC msg 3.
5. The network replies 320 with an RRCSetup message.
   If the second solution applies, this message may be modified accordingly to include an additional indication towards the UE as to whether to include the NSSAI information in an RRC msg 5 (step 6).
   If the first solution applies (i.e. the RAN node has included an indication in the SI to require the UE to send the NSSAI information), the RAN node may determine to assign larger AS resources for the RRC msg 5, since the RAN node expects that the RRC msg 5 can be a bit larger by including the NSSAI information.
6. The UE sends 322 an RRCSetupComplete message, which can also be described as RRC msg 5. This message may include the NSSAI information along with the NAS message as described in the first solution.
   The NSSAI information included in this RRC msg 5 may be described as IE 'Requested NSSAI', such as in case this information is equal to the Allowed NSSAI. Another option may be to describe this information element (IE) as 'service NSSAI' or similar name to indicate that the S-NSSAI(s) included in the NSSAI information are the S-NSSAI, for which the service request has been sent from the NAS layer. In other words, the UE may indicate which S-NSSAI(s) are included in the NSSAI information by indicating whether this is complying with value a, or value b, from the description for first solution.
7. The RAN node can determine 324 whether to accept or to reject the RRC connection establishment based on the received NSSAI information in step 6 and based on the network slice load/congestion conditions according to step 0.
8. If one or more of the S-NSSAI(s) part of the NSSAI information included in step 6 are part of the network slice overload/congestion control at the RAN, the RAN node may reject (or release) 326 the RRC Connection establishment. The RAN node may include one or more specific S-NSSAI values within the reject/release cause value (or as an independent parameter).

In addition the RAN node can include a timer to indicate to the UE for how long time the UE is not allowed to initiate U-Plane resource activation/establishment for a particular network slice (e.g. S-NSSAI).

Within the UE (mainly step 2 of FIG. 3), the following processing can be applied in order to apply UE configuration according to the above noted proposed solutions, such as the first solution:

Activation of the mechanism of including the NSSAI information in the RRC connection establishment signaling for service request procedure:
If the UE enters a new cell where the broadcasted system information is used to indicate that the NSSAI information is required in the RRC connection establishment signaling for the service request procedure; or
if the broadcasted system information changes to include an indication that the NSSAI information is required in the RRC connection establishment signaling for the service request procedure,
The AS layer sends this indication to the NAS layer. If the system information indication also includes a type of NSSAI to be included in the RRC signaling (e.g. all S-NSSAIs from the Allowed NSSAI or the S-NSSAI(s) triggering the UP resource activation), the AS layer also sends this information to the NAS layer. The AS layer may keep track of the fact that the NAS layer has been informed about the indication, so that the AS layer does not need to inform the NAS layer again until the broadcast indication changes; or, until when the UE moves to a new cell where the system information containing the indication that the NSSAI is required.
After the NAS layer has received an indication from the AS layer, the NAS layer shall send the corresponding NSSAI information to the AS layer when the NAS layer triggers the service request procedure from an evolved packet system (EPS) Connection Management—(E)CM IDLE state.
Deactivation of the mechanism of including the NSSAI information in the
RRC connection establishment signaling for the service request procedure:
If the UE enters a new cell where the broadcasted system information does not indicate that the NSSAI information is required in the RRC connection establishment signaling for service request procedure; or
if the broadcasted system information changes to exclude an indication that the NSSAI information is required in the RRC connection establishment signaling for the service request procedure,
the AS layer sends an indication to the NAS layer that the NSSAI information is not required in the RRC signaling for the service request procedure.
Within the UE, if dedicated signaling from the RAN node to the UE is used to indicate that NSSAI information is required in the RRC connection establishment signaling for the service request procedure, such as the second solution, the NAS layer can send the NSSAI information to the AS layer and the AS layer can decide which information to include in the RRC signaling, for example as in RRC msg 5, such as all accepted slice IDs or the particular slice ID relevant for this service request as indicated by the NAS to the Access Stratum.

The potential benefits of the proposed solutions can include the ability to configure the UEs for sending NSSAI information in the Access Stratum connection establishment signaling caused by a service request in a flexible manner, such as including or changing the broadcasted SI, and for limited topological locations, such as for a single cell or group of cells in the registration area. Such a configuration of the UEs can be performed based on the network operator needs and regional load conditions.

It is noted that the disclosed solution(s) are described mainly using New Radio (NR) RAT terminology, but the solution(s) are not limited to NR and may also apply to other radio access technologies (RATs) or communication systems, e.g. LTE/EPS, or UTRAN/UMTS, etc.

Figure 4:
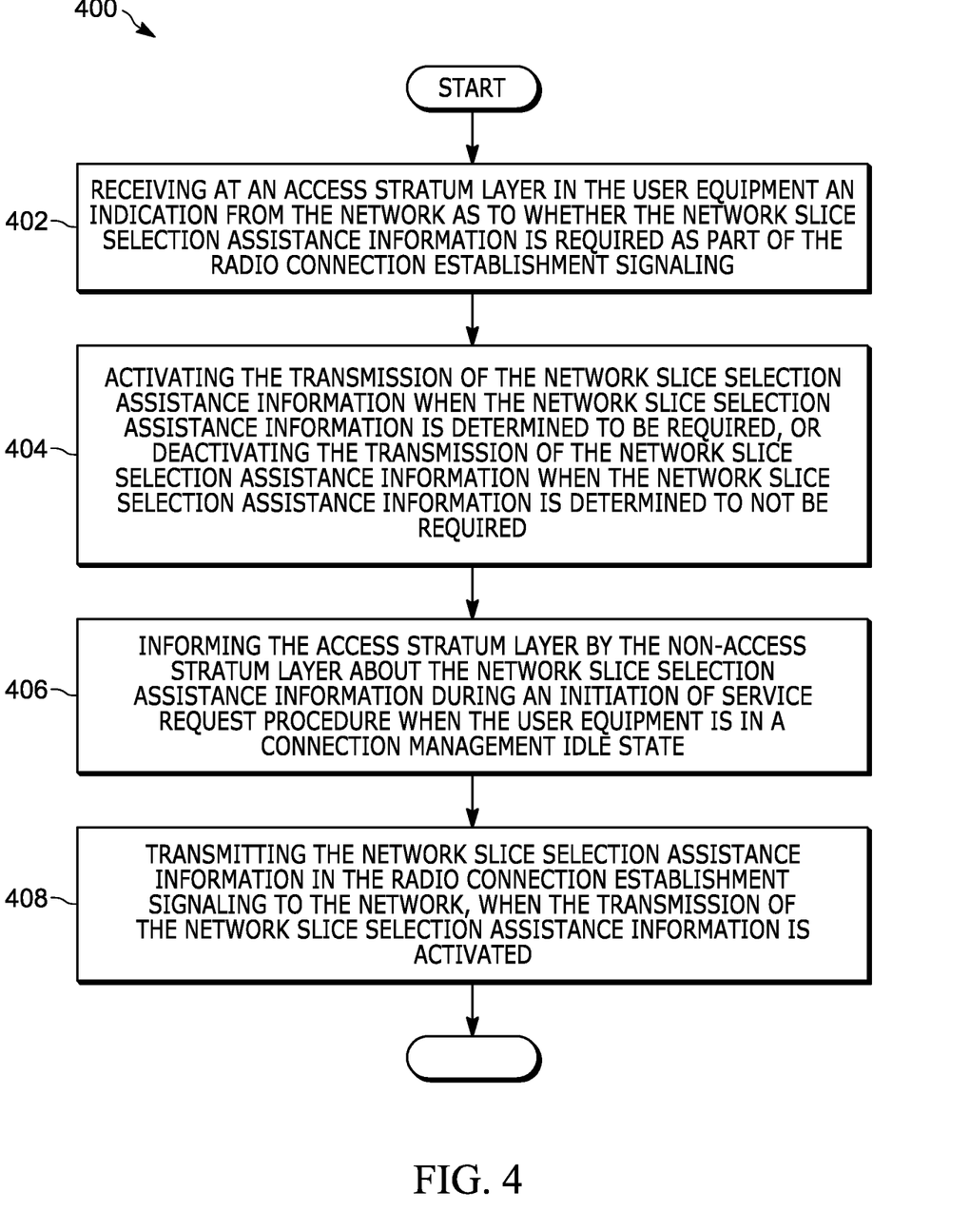
FIG. 4 is a flow diagram in a user equipment for determining whether to transmit network slice selection assistance information.

FIG. 4 illustrates a flow diagram 400 in a user equipment for determining whether to transmit network slice selection assistance information. The method includes receiving 402 at an access stratum layer in the user equipment an indication from the network as to whether the network slice selection assistance information is required as part of the radio connection establishment signaling. The transmission of the network slice selection assistance information is activated when the network slice selection assistance information is determined to be required, or the transmission of the network slice selection assistance information is deactivated when the network slice selection assistance information is determined to not be required 404. The method further includes informing 406 the access stratum layer by the non-access stratum layer about the network slice selection assistance information during an initiation of service request procedure when the user equipment is in a connection management idle state; and transmitting 408 the network slice selection assistance information in the radio connection establishment signaling to the network, when the transmission of the network slice selection assistance information is activated.

In some instances, the indication from the network may include system information received from a cell of the network. In some of these instances, the system information received from a cell of the network may be broadcasted system information, which may be received while the cell of the network is operating as a serving cell.

In some instances, the indication from the network may include radio resource control signaling from the network. In some of these instances, the indication from the network included as part of the radio resource control signaling from the network may be included as part of a radio resource control connection setup message.

In some instances, transmission of the network slice selection assistance information in the radio connection establishment signaling may be included as part of a radio resource control connection complete message.

In some instances, the access stratum layer in the user equipment is configured to inform the non-access stratum layer as to whether the network slice selection assistance information is required or not. The non-access stratum layer can determine to send the network slice selection assistance information to the access stratum layer e.g. during service request procedure, if the network slice selection assistance information is required. The non-access stratum layer can determine to omit sending the network slice selection assistance information to the access stratum layer e.g. during service request procedure, if the network slice selection assistance information is not required.

In some instances, the signaling information may include a parameter which is always present that can include an associated value that selectively identifies between an indication that network slice selection assistance information for all allowed slices needs to be included in the radio connection establishment signaling, an indication that network slice selection assistance information is included in the radio connection establishment signaling for at least the slices for which a packet data unit connection is to be activated, and an indication that network slice selection assistance information does not need to be included.

In some instances, the signaling information may include a parameter which is optionally present, where when present the value of the parameter can distinguish between an indication that network slice selection assistance information for all allowed slices needs to be included in the radio connection establishment signaling, and an indication that network slice selection assistance information is included in the radio connection establishment signaling for at least the slices for which a packet data unit connection is to be activated, and where when absent can serve as an indication that network slice selection assistance information does not need to be included.

In some instances, when the radio connection establishment signaling is part of an attempt to resume a connection from an inactive state, the determination as to whether network slice selection assistance information is required may be based upon system information from the cell that is to currently operate as a serving cell. In some instances, the transmission of the network slice selection assistance information may be activated, when the user equipment transitions from an old cell that does not require network slice selection assistance information to a new cell that requires network slice selection assistance information, or if the system information associated with a current cell changes to include an indication that network slice selection assistance information is required.

In some instances, the transmission of the network slice selection assistance information may be deactivated, when the user equipment transitions from an old cell that requires network slice selection assistance information to a new cell that does not require network slice selection assistance information, or if the system information associated with a current cell changes to include an indication that network slice selection assistance information is no longer required.

Figure 5:
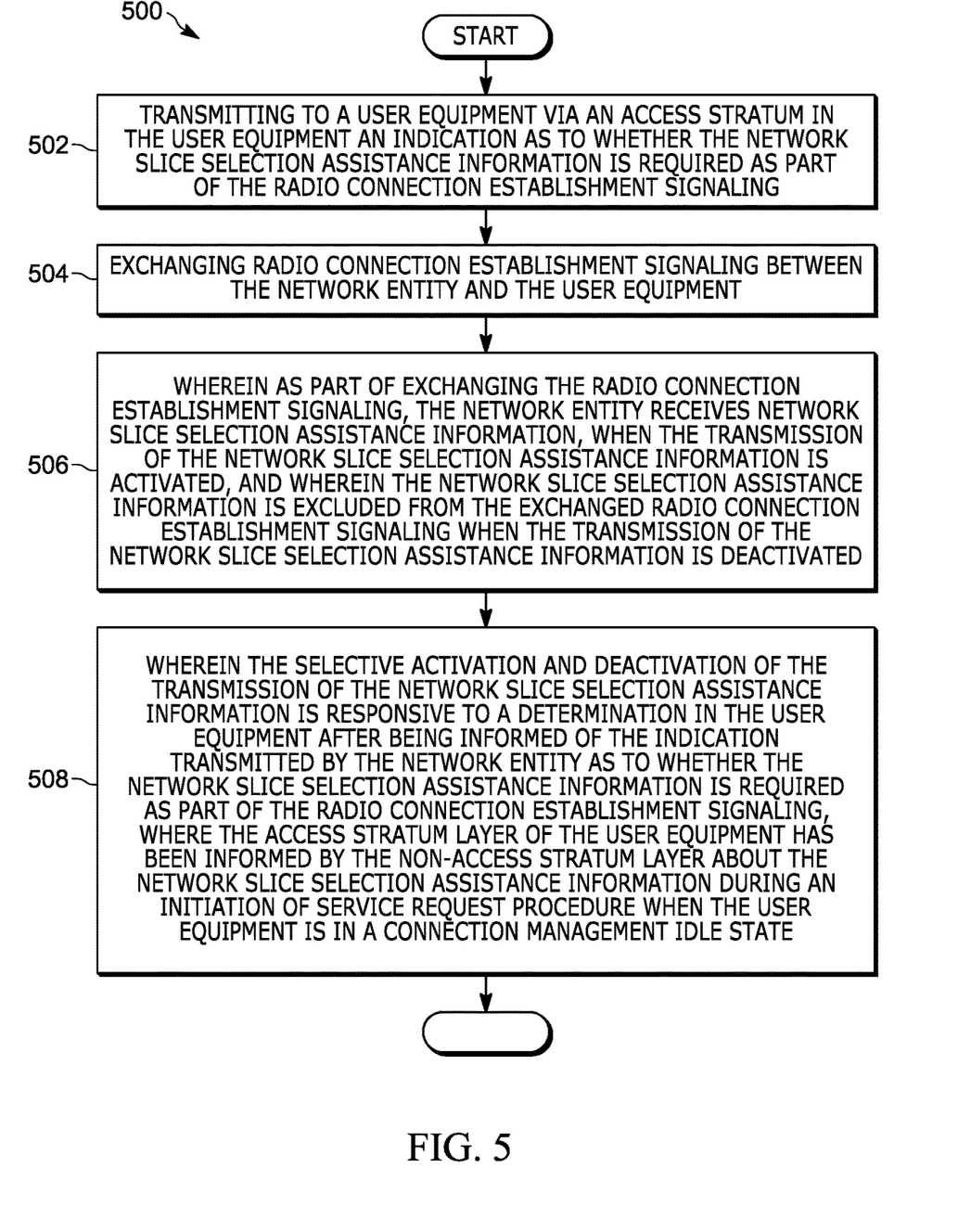
FIG. 5 is a flow diagram in a network entity for providing an indication which is used to selectively activates and deactivates in a user equipment the transmission and respective reception by the network entity of slice selection assistance information.

FIG. 5 illustrates a flow diagram 500 in a network entity for providing an indication which is used to selectively activates and deactivates in a user equipment the transmission and respective reception by the network entity of slice selection assistance information. The method includes transmitting 502 to a user equipment via an access stratum in the user equipment an indication as to whether the network slice selection assistance information is required as part of the radio connection establishment signaling, and exchanging 504 radio connection establishment signaling between the network entity and the user equipment. As part of exchanging the radio connection establishment signaling, the network entity receives 506 network slice selection assistance information, when the transmission of the network slice selection assistance information is activated, and the network slice selection assistance information is excluded from the exchanged radio connection establishment signaling when the transmission of the network slice selection assistance information is deactivated. The selective activation and deactivation of the transmission of the network slice selection assistance information is responsive 508 to a determination in the user equipment after being informed of the indication transmitted by the network entity as to whether the network slice selection assistance information is required as part of the radio connection establishment signaling, where the access stratum layer of the user equipment has been informed by the non-access stratum layer about the network slice selection assistance information during an initiation of service request procedure when the user equipment is in a connection management idle state.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 6:
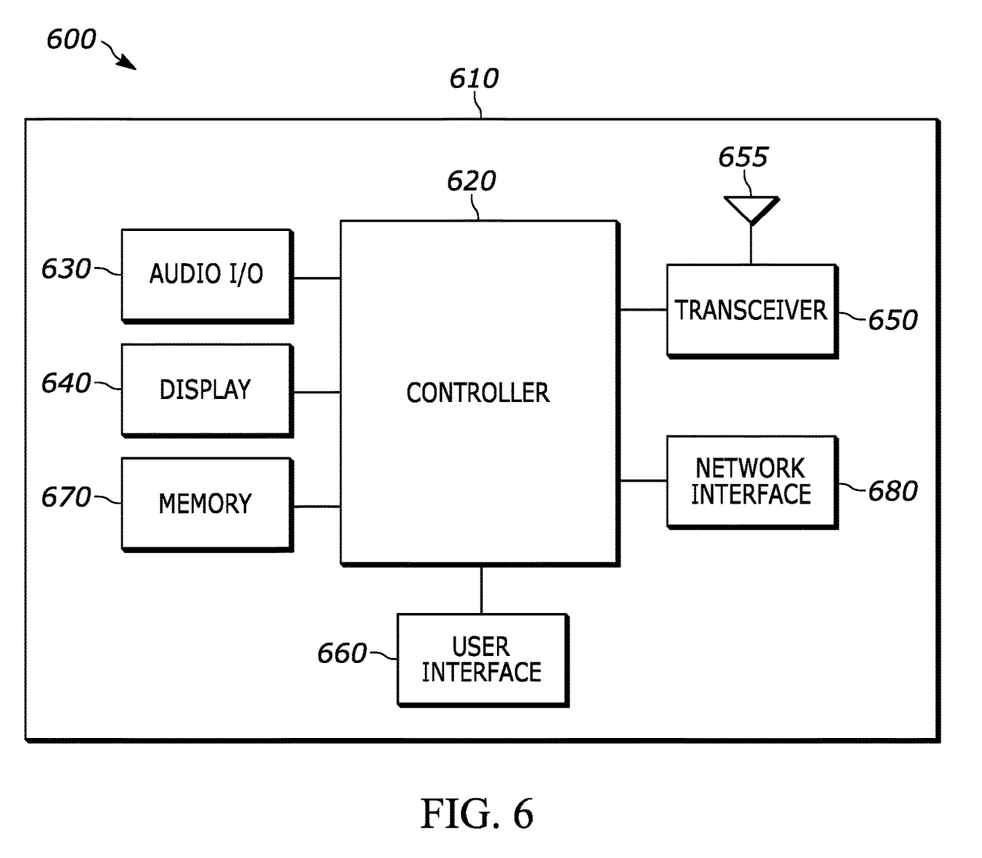
FIG. 6 is an example block diagram of an apparatus according to a possible embodiment.

FIG. 6 is an example block diagram of an apparatus 600, such as the wireless communication device 110, according to a possible embodiment. The apparatus 600 can include a housing 610, a controller 620 within the housing 610, audio input and output circuitry 630 coupled to the controller 620, a display 640 coupled to the controller 620, a transceiver 650 coupled to the controller 620, an antenna 655 coupled to the transceiver 650, a user interface 660 coupled to the controller 620, a memory 670 coupled to the controller 620, and a network interface 680 coupled to the controller 620. The apparatus 600 can perform the methods described in all the embodiments The display 640 can be a viewfinder, a liquid crystal display (LCD), a light emitting diode (LED) display, a plasma display, a projection display, a touch screen, or any other device that displays information. The transceiver 650 can include a transmitter and/or a receiver. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a WLAN transceiver, or any other interface that can connect an apparatus to a network, device, or computer and that can transmit and receive data communication signals. The memory 670 can include a random access memory, a read only memory, an optical memory, a solid state memory, a flash memory, a removable memory, a hard drive, a cache, or any other memory that can be coupled to an apparatus.

The apparatus 600 or the controller 620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 670 or elsewhere on the apparatus 600. The apparatus 600 or the controller 620 may also use hardware to implement disclosed operations. For example, the controller 620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

What is claimed is:

1. A method in a network entity comprising:
   transmitting to a user equipment via an access stratum signaling an indication as to whether network slice selection assistance information is required as part of radio connection establishment or resumption signaling;
   receiving the network slice selection assistance information; and
   determining whether to accept or to reject a radio resource control connection establishment or resumption based on the received network slice selection assistance information.

2. The method in accordance with claim 1, wherein a transmission of the network slice selection assistance information is selectively activated and deactivated in the user equipment responsive to the indication from the network entity as to whether the network slice selection assistance information is identified as being required as part of the radio connection establishment or resumption signaling.

3. The method in accordance with claim 2, wherein when the network slice selection assistance information is identified in the indication as being required, the transmission of the network slice selection assistance information is activated in the user equipment; and when the network slice selection assistance information is identified in the indication as not being required, the transmission of the network slice selection assistance information is deactivated in the user equipment.

4. The method in accordance with claim 1, wherein an access stratum layer of the user equipment is informed by a non-access stratum layer about the network slice selection assistance information during an initiation of service request procedure when the user equipment is in a connection management idle state.

5. The method in accordance with claim 1, wherein the radio resource control connection establishment or resumption is accepted, when the network slice selection assistance information, that has been identified as being required, is included as part of the radio connection establishment or resumption signaling.

6. The method in accordance with claim 1, wherein the radio resource control connection establishment or resumption is rejected, when the network slice selection assistance information, that has been identified as being required, is not included as part of the radio connection establishment or resumption signaling.

7. The method according to claim 1, wherein the indication transmitted by the network entity to the user equipment includes system information from a cell of a network.

8. The method according to claim 7, wherein the system information from the cell of the network is broadcasted system information, which is transmitted while the cell of the network is operating as a serving cell.

9. The method according to claim 1, wherein the indication transmitted by the network entity includes radio resource control signaling transmitted by the network entity.

10. The method according to claim 9, wherein the indication transmitted by the network entity included as part of the radio resource control signaling transmitted by the network entity is included as part of a radio resource control connection setup message.

11. The method according to claim 1, wherein the received network slice selection assistance information is included as part of a radio resource control connection complete message.

12. The method according to claim 1, wherein an access stratum layer in the user equipment is configured to inform a non-access stratum layer as to whether the network slice selection assistance information is required or not.

13. The method according to claim 1, wherein the indication includes a parameter, which is always present, that has an associated value that selectively identifies between an indication that the network slice selection assistance information for all allowed slices needs to be included in the radio connection establishment or resumption signaling, an indication that the network slice selection assistance information is included in the radio connection establishment or resumption signaling for at least the slices for which a packet data unit connection is to be activated, and an indication that the network slice selection assistance information does not need to be included.

14. The method according to claim 1, wherein the indication includes a parameter, which is optionally present, where when present an associated value of the parameter can distinguish between an indication that the network slice selection assistance information for all allowed slices needs to be included in the radio connection establishment or resumption signaling, and an indication that the network slice selection assistance information is included in the radio connection establishment or resumption signaling for at least the slices for which a packet data unit connection is to be activated, and where when absent serves as an indication that the network slice selection assistance information does not need to be included.

15. The method according to claim 1, wherein when the radio resource control connection establishment or resumption signaling is part of an attempt to resume a connection from an inactive state, the determination as to whether the network slice selection assistance information is required is based upon system information from a cell that is to currently operating as a serving cell.

16. A network entity for communicating with one or more user equipment in a communication network, the network entity comprising:
a controller; and
a transceiver that transmits to a user equipment via an access stratum signaling an indication as to whether network slice selection assistance information is required as part of radio connection establishment or resumption signaling;
wherein the network slice selection assistance information is received via the transceiver; and
wherein the controller determines whether to accept or to reject a radio resource control connection establishment or resumption based on the received network slice selection assistance information.

17. The network entity in accordance with claim 16, wherein a transmission of the network slice selection assistance information is selectively activated and deactivated in the user equipment responsive to the indication from the network entity as to whether the network slice selection assistance information is identified as being required as part of the radio connection establishment or resumption signaling.

18. The network entity in accordance with claim 17, wherein when the network slice selection assistance information is identified in the indication as being required, the transmission of the network slice selection assistance information is activated in the user equipment; and when the network slice selection assistance information is identified in the indication as not being required, the transmission of the network slice selection assistance information is deactivated in the user equipment.

19. The network entity in accordance with claim 16, wherein the radio resource control connection establishment or resumption is accepted, when the network slice selection assistance information, that has been identified as being required, is included as part of the radio connection establishment or resumption signaling.

20. The network entity in accordance with claim 16, wherein the radio resource control connection establishment or resumption is rejected, when the network slice selection assistance information, that has been identified as being required, is not included as part of the radio connection establishment or resumption signaling.

* * * * *